United States Patent
Lee et al.

(10) Patent No.: US 8,606,408 B2
(45) Date of Patent: Dec. 10, 2013

(54) CONTROL SYSTEM AND METHOD FOR FAN

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 129 days.

(21) Appl. No.: 13/222,377

(22) Filed: Aug. 31, 2011

(65) Prior Publication Data

US 2013/0024027 A1   Jan. 24, 2013

(30) Foreign Application Priority Data

Jul. 22, 2011   (TW) .............................. 100125912 A

(51) Int. Cl.
| | | |
|---|---|---|
| *G01B 11/14* | (2006.01) | |
| *G01C 9/00* | (2006.01) | |
| *G01J 1/42* | (2006.01) | |
| *G01J 5/00* | (2006.01) | |
| *G03B 15/02* | (2006.01) | |
| *G05D 23/00* | (2006.01) | |

(52) U.S. Cl.
USPC ........ 700/275; 700/276; 700/278; 250/208.2; 250/338.1; 396/61; 396/62; 702/150; 702/151; 702/152; 702/158

(58) Field of Classification Search
USPC ............ 700/275, 276, 278; 250/208.2, 338.1; 702/152, 150, 151, 158; 396/61, 62
See application file for complete search history.

(56) References Cited

U.S. PATENT DOCUMENTS

| | | | |
|---|---|---|---|
| 7,185,504 B2 * | 3/2007 | Kasai et al. ..................... 62/186 |
| 7,255,161 B2 * | 8/2007 | Durach et al. ................ 165/202 |
| 2002/0110373 A1 * | 8/2002 | Engle et al. .................... 396/263 |
| 2004/0129007 A1 * | 7/2004 | Tomita et al. ................... 62/157 |
| 2006/0155421 A1 * | 7/2006 | Baek et al. ..................... 700/276 |
| 2007/0229661 A1 * | 10/2007 | Aoki et al. ..................... 348/148 |
| 2009/0210193 A1 * | 8/2009 | Nagase ......................... 702/152 |
| 2010/0168922 A1 * | 7/2010 | Park et al. ..................... 700/276 |
| 2010/0168923 A1 * | 7/2010 | Park et al. ..................... 700/278 |
| 2012/0023977 A1 * | 2/2012 | Kim et al. ........................ 62/89 |
| 2013/0085609 A1 * | 4/2013 | Barker ......................... 700/276 |

FOREIGN PATENT DOCUMENTS

GB      2260830 A   *   4/1993

* cited by examiner

*Primary Examiner* — Mohammad Ali
*Assistant Examiner* — Jennifer L Norton
(74) *Attorney, Agent, or Firm* — Altis Law Group, Inc.

(57) ABSTRACT

A safety control method for a fan includes: capturing an image of an object next to the fan and gathering distances between a plurality of points on the object and a depth-sensing camera, obtaining the distance between the object in the scene and the fan, comparing the distance between the object and the fan against a first preset value, and cutting off power to the fan when the distance between the object and the fan is less than the first preset value.

6 Claims, 4 Drawing Sheets

CONTROL SYSTEM AND METHOD FOR FAN

BACKGROUND

1. Technical Field

The present disclosure relates to a system and a method to control a fan.

2. Description of Related Art

When a fan operates, the fan blades rotate at high speed. If users are careless, they may be injured.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
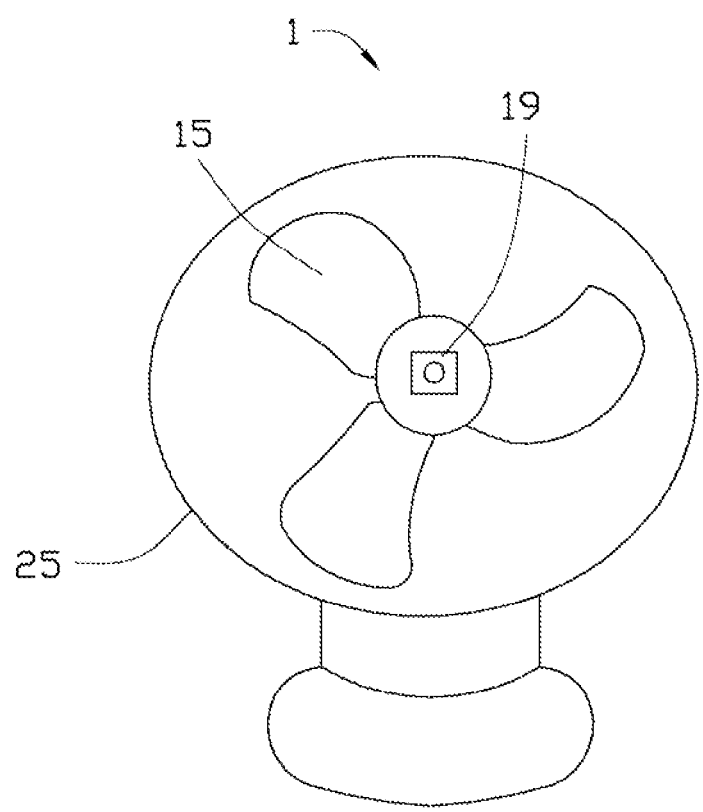
FIG. 1 is a view of a fan of an embodiment of the disclosure.
Figure 2:
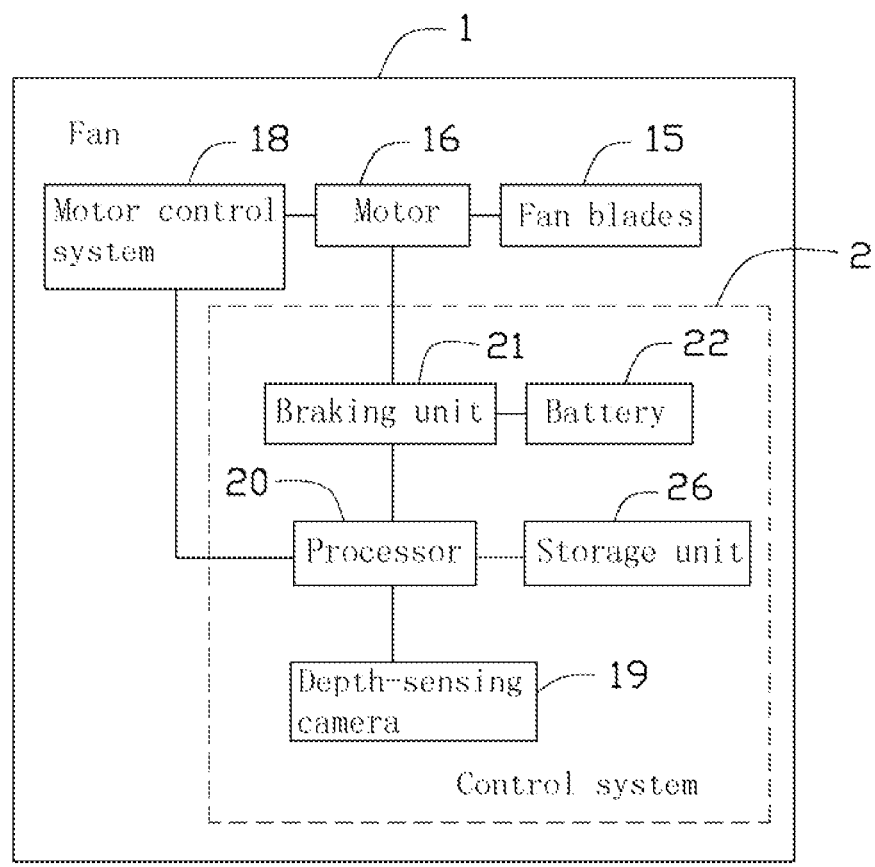
FIG. 2 is a block diagram of the fan of FIG. 1, the fan including a control system and a storage unit.

Referring to FIGS. 1 and 2, an embodiment of a fan 1 includes a chassis 25, a plurality of fan blades 15, a motor 16, a motor control system 18, a depth-sensing camera 19, a processor 20, a storage unit 26, a battery 22, and a braking unit 21. The motor 16 drives the fan blades 15 to rotate. The motor control system 18 controls the motor 16. The chassis 25 encloses the fan blade 15, the motor 16, the motor control system 18, the processor 20, the storage unit 26, the battery 22, and the braking unit 21. After the fan 1 is powered off, the battery 22 supplies power to the processor 20, the storage unit 26, and the braking unit 21. The braking unit 21 stops the fan blades 15. The depth-sensing camera 19, the processor 20, the storage unit 26, the battery 22, and the braking unit 21 form a control system 2.

In the embodiment, the depth-sensing camera 19 is a time of flight (TOF) camera mounted on the chassis 25. The TOF camera captures an image of an object next to the fan 1 and in the line of sight of the TOF camera, and continually gathers data as to the distance(s) between a plurality of points on the object in the scene and the TOF camera (which is called distance data hereinafter). The processor 20 processes the images and the distance data obtained by the depth-sensing camera 19.

Figure 3:
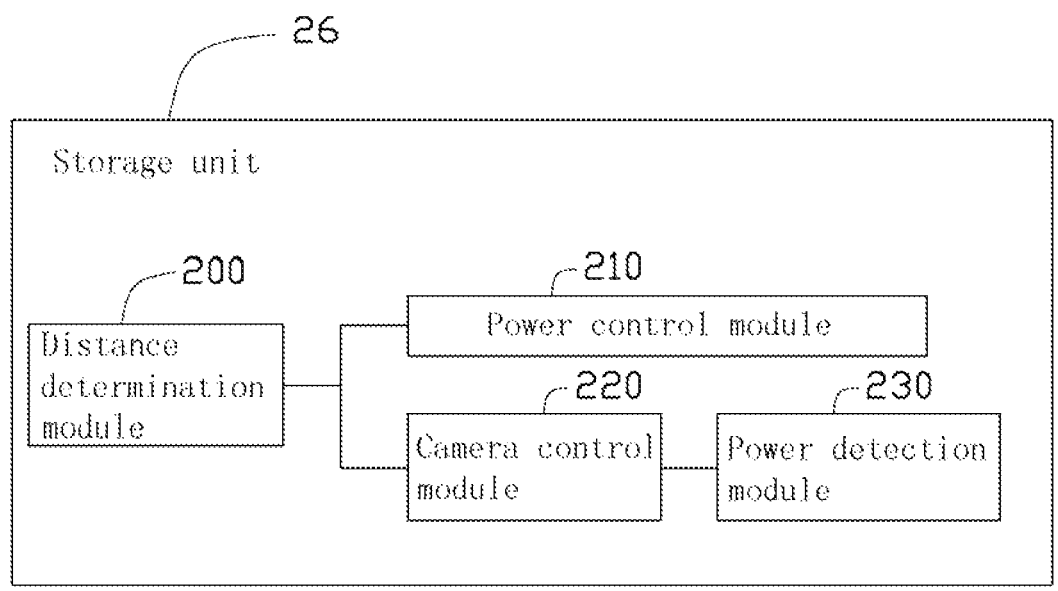
FIG. 3 is a block diagram of the storage unit of FIG. 2.

Referring to FIG. 3, the storage unit 26 includes a distance determination module 200, a camera control module 220, a power control module 210, and a power detection module 230 which may include one or more computerized instructions executed by the processor 20.

The distance determination module 200 receives the distance data from the depth-sensing camera 19. In the embodiment, the depth-sensing camera 19 mounted on the chassis 25 of the fan 1 is for the purpose of establishing a distance(s) between the fan and any other point. Furthermore, the shortest distance of the plurality of distances can be regarded as the distance between the fan 1 and the object in the scene because the point having the shortest distant may come in contact with the fan blades 15 first when the object moves towards the fan 1.

The distance determination module 200 further compares the distance (determined as above) between the object and the fan 1 against a plurality of preset values. In the embodiment, the preset values include a first, and a second preset values, which define a safe range, an alert range, and a danger range. The first preset value is less than the second preset value. When the distance between the object and the fan 1 is greater than the second preset value, it indicates that the object is in the safe range. When the distance between the object and the fan 1 is between the first preset value and the second preset value, it indicates that the object is in the alert range. When the distance between the object and the fan 1 is less than the first preset value, it indicates that the object is in the danger range.

The camera control module 220 controls the activity of the depth-sensing camera 19 according to the distance between the object and the fan 1. When the object is in the safe range, the camera control module 220 may decrease the frequency of the capturing of images (shooting frequency) by the depth-sensing camera 19, such as one shot per second. When the object is in the alert range, the camera control module 220 may increase the shooting frequency of the depth-sensing camera 19, to such as ten shots per second. When the object is in the danger range, the power control module 210 cuts off power supplied to the motor 16 of the fan 1. In the embodiment, the basic or default shooting frequency of the depth-sensing camera 19 can be set as three shots per second.

The power detection module 230 can detect the lack of a power supply to the motor 16. When the motor 16 is powered off, the battery 22 supplies power to the braking unit 21 and the braking unit 21 may stop the rotation of the fan blades 15 as quickly as possible.

Figure 4:
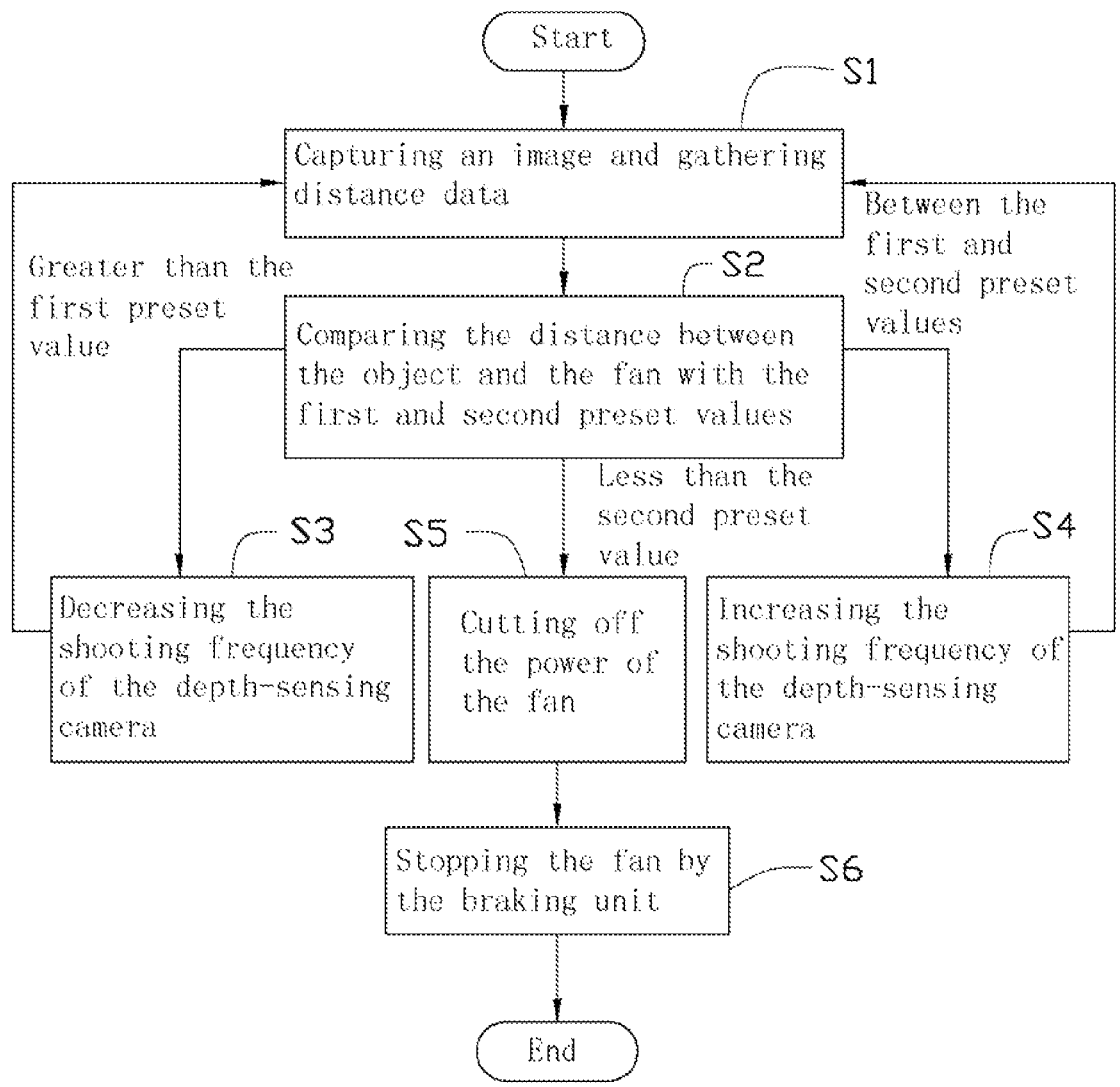
FIG. 4 is a flowchart of an exemplary embodiment of a control method for the fan of FIG. 1.

Referring to FIG. 4, an exemplary embodiment of a control method for the fan 1 includes the following steps.

In step S1, the depth-sensing camera 19 captures an image of an object next to the fan 1 and the line of sight of the depth-sensing camera 19, and gathers distance data between a plurality of points on the object and the depth-sensing camera 19.

In step S2, the distance determination module 200 compares the distance between the object and the fan 1 against the first and second preset values. When the distance between the object and the fan 1 is greater than the second preset value, the process flows to step S3. When the distance between the object and the fan 1 is more than the first preset value but less than the second preset value, the process flows to step S4. When the distance between the object and the fan 1 is less than the first preset value, the process flows to step S5.

In the embodiment, the depth-sensing camera 19 being mounted on the chassis 25 of the fan 1 allows the distance between the points on the object and the depth-sensing camera 19 to be regarded as representing the distance between any plurality of points on the object and the fan 1. Furthermore, the shortest distance of the plurality of distances between the points and the depth-sensing camera 19 can be regarded as the distance between the object and the fan 1.

In step S3, the camera control module 220 decreases the shooting frequency of the depth-sensing camera 19, to a rate such as one shot per second, then the process returns to step S1.

In step S4, the camera control module 220 increases the shooting frequency of the depth-sensing camera 19, to a rate such as ten shots per second, then the process returns to step S1.

In step S5, the power control module 210 cuts off the power to the motor 16 of the fan 1.

In step S6, the battery 22 supplies power to the braking unit 21, and the braking unit 21 stops the rotation of the fan blades 15.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments have been chosen and described in order to explain the principles of the disclosure and their practical application so as to enable those of ordinary skill in the art to utilize the disclosure and its various embodiments and with such modifications as are suited to the particular use contemplated. Alternative embodiments will be apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A control system for a fan, the control system comprising:
    a depth-sensing camera to capture an image of an object next to the fan in the line of sight of the depth-sensing camera and gathers distance data between a plurality of points on the object and the depth-sensing camera;
    a processor connected to the depth-sensing camera to process the image and the distance data from the depth-sensing camera; and
    a storage unit connected to the processor unit and storing a plurality of programs to be executed by the processor, wherein the storage unit comprises:
a distance determination module to obtain a distance between the object and the fan, and compares the distance between the object and the fan against a first preset value; and
    a power control module to cut off power supplied to the fan when the distance between the object and the fan is less than the first preset value;
    wherein the storage unit further comprises a camera control module;
    the distance determination module further compares the distance between the object and the fan against a second preset value;
    when the distance between the object and the fan is greater than the second preset value, the camera control module sets a shooting frequency of the depth-sensing camera as a first frequency;
    when the distance between the object and the fan is between the first and second preset values, the camera control module sets the shooting frequency of the camera as a second frequency;
    the first frequency is less than the second frequency.

2. The control system of claim 1, further comprising a battery and a braking unit, wherein the storage unit further comprises a power detection module to detect whether the fan is powered off, when the fan is powered off, the battery provides power to the braking unit to stop the rotation of the fan.

3. A control method for a fan, the control method comprising:
    capturing an image of an object next to the fan, and gathering distances between a plurality of points on the object and a depth-sensing camera by the depth-sensing camera;
    obtaining a distance between the object in the scene and the fan;
comparing the distance between the object and the fan against a first preset value;
    comparing the distance between the object and the fan against a second preset value;
    setting a shooting frequency of the depth-sensing camera as a first frequency when the distance is greater than the second preset value; and
    cutting off power supplied to the fan when the distance between the object and the fan is less than the first preset value.

4. The control method of claim 3, after step comparing the distance between the object and the fan against a second preset value further comprising:
    setting a shooting frequency of the depth-sensing camera as a second frequency when the distance is between the first and second preset values.

5. The control method of claim 3, after step cutting off power supplied to the fan when the distance between the object and the fan is less than the first preset value further comprising:
    providing power to the braking unit by a battery to stop the rotation of the fan.

6. A control system for a fan, the control system comprising:
    a depth-sensing camera to capture an image of an object next to the fan in the line of sight of the depth-sensing camera and gathers distance data between a plurality of points on the object and the depth-sensing camera;
    a processor connected to the depth-sensing camera to process the image and the distance data from the depth-sensing camera;
    a storage unit connected to the processor unit and storing a plurality of programs to be executed by the processor, wherein the storage unit comprises:
        a distance determination module to obtain a distance between the object and the fan, and compares the distance between the object and the fan against a first preset value; and
        a power control module to cut off power supplied to the fan when the distance between the object and the fan is less than the first preset value; and
        a battery and a braking unit, wherein the storage unit further comprises a power detection module to detect whether the fan is powered off, when the fan is powered off, the battery provides power to the braking unit to stop the rotation of the fan.

* * * * *